United States Patent

Roach

[11] Patent Number: 5,960,899
[45] Date of Patent: Oct. 5, 1999

[54] MECHANISM FOR MOUNTING A RADIATOR ABOVE A VERTICAL SHAFT ENGINE

[75] Inventor: James Edward Roach, West Bend, Wis.

[73] Assignee: Deere & Company, Moline, Ill.

[21] Appl. No.: 09/115,622

[22] Filed: Jul. 14, 1998

[51] Int. Cl.$^6$ .................................................. B60K 11/04
[52] U.S. Cl. .................. 180/68.4; 180/68.1; 267/140.13
[58] Field of Search ................. 180/68.4, 68.6, 180/68.1, 68.2, 299, 291; 267/140.13, 140.11

[56] References Cited

U.S. PATENT DOCUMENTS

| | | | |
|---|---|---|---|
| 4,403,648 | 9/1983 | Styok ...................................... | 180/68.6 |
| 4,862,981 | 9/1989 | Fujikawa et al. ....................... | 180/68.4 |
| 5,036,931 | 8/1991 | Iritani ..................................... | 180/68.1 |
| 5,209,314 | 5/1993 | Nishiyama .............................. | 180/68.6 |
| 5,597,047 | 1/1997 | Thompson et al. ..................... | 180/68.6 |
| 5,678,648 | 10/1997 | Imanishi et al. ........................ | 180/68.1 |
| 5,816,350 | 10/1998 | Akira et al. ............................. | 180/68.1 |
| 5,816,351 | 10/1998 | Akira et al. ............................. | 180/68.1 |

*Primary Examiner*—Lanna Mai
*Assistant Examiner*—Lynda Jasmin

[57] ABSTRACT

A vehicle having a vertical shaft engine mounted to the vehicle frame via elastic mounting units which allow vibratory motion between the engine and the frame for reducing the amount of vibration transmitted from the engine to the frame during operation of the engine. A cooling fan is positioned directly above the engine for pulling air downwardly through a radiator positioned directly above the engine and fan. The radiator is supported in its position above the engine by being rigidly fixed with support members. The support members are rigidly fixed with and extend upwardly from the frame. The radiator is held in position by the support members and is not supported by the engine, and therefore the radiator is generally isolated from engine vibrations by the elastic mounting units.

23 Claims, 4 Drawing Sheets

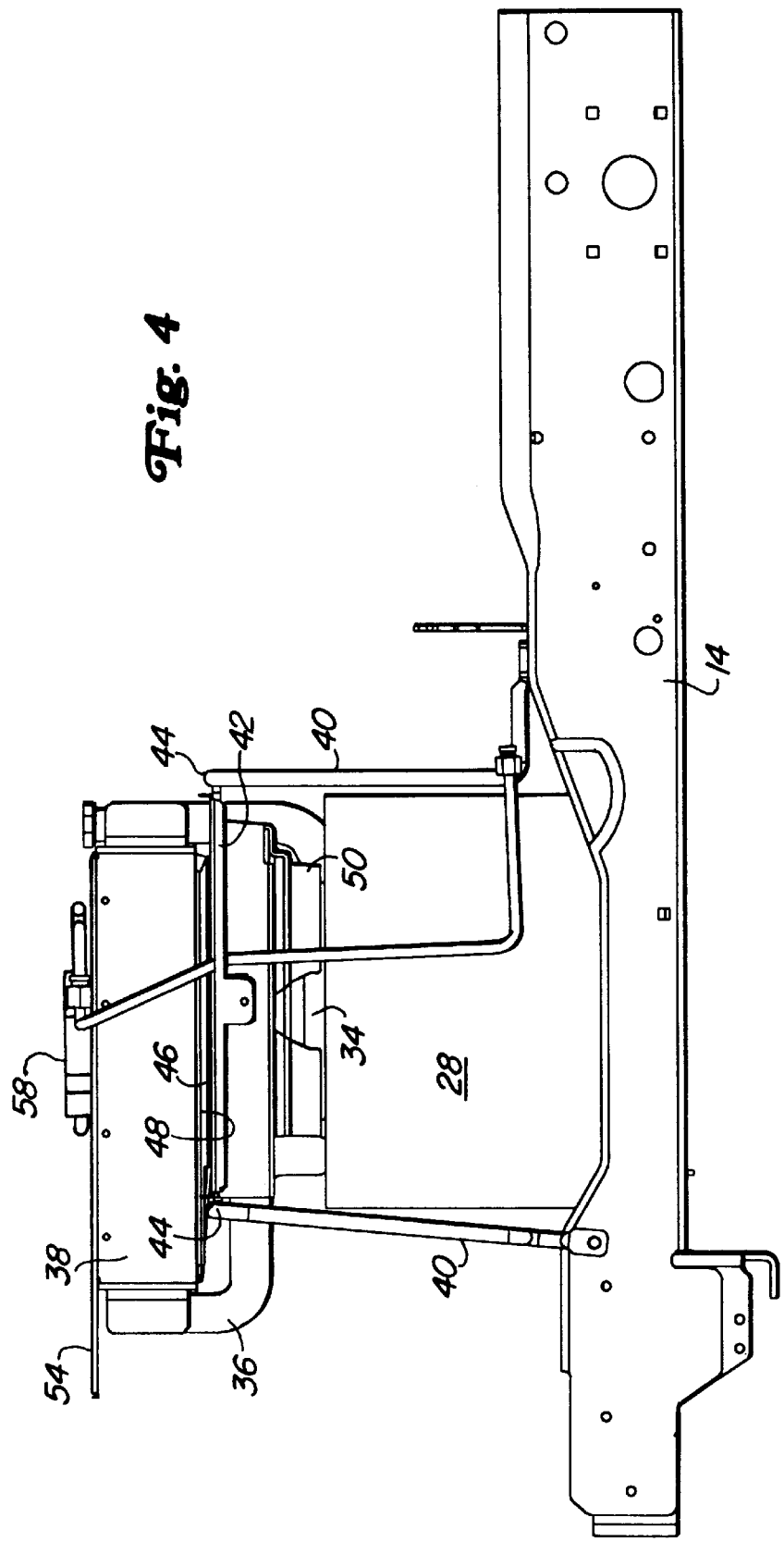

MECHANISM FOR MOUNTING A RADIATOR ABOVE A VERTICAL SHAFT ENGINE

BACKGROUND OF THE INVENTION

The present invention relates to mechanisms for mounting vehicle radiators.

Lawn and garden tractors typically include an engine for driving ground engaging drive wheels and other vehicle implements such as mowers. Some engines are oriented such that their crank shafts extend vertically. Water cooled engines of this type typically include a radiator that is positioned above the engine. A cooling fan is positioned directly between the radiator and the engine. The cooling fan serves to pull air downwardly through the radiator. Heat from the radiator is transmitted to the air flowing through the radiator. The fan then directs the hot air through suitable discharge ducts. The fluid within the radiator is cooled by the flow of air, and then re-circulates to the engine for further cooling the engine.

The engines described above are often mounted to the frame by way of rubber bumpers or cushions. The rubber cushions or isolators allow the engine to vibrate with respect to the frame, and therefore the rubber cushions effectively isolate the engine from the frame for preventing vibrations of the engine from being transmitted into the frame. This generally results in less vehicle shaking and rattling, and therefore results in less noisy operation and a more comfortable ride for the operator. Excessive vehicle vibration can also cause wear or damage to other vehicle components.

The radiators provided by lawn and garden tractors of this type are typically rigidly fixed with the top portion of the engine. The radiator will therefore vibrate with the engine during engine operation. Typical radiators are rugged enough that they will not be damaged by the vibrations experienced when fixed in this manner to the top portions of gas powered engines. Diesel fuel engines tend to vibrate more than gas powered engines, and radiators fixed above a diesel fuel engine in this manner may have to be more ruggedly constructed, such as with more substantial part thicknesses, to withstand the greater vibrational force encountered during operation. These more rugged radiators are generally more costly to manufacture.

The engines of other lawn maintenance vehicles are oriented horizontally such that the engine crank shaft extends generally horizontally. The radiators for these vehicles typically extend vertically and are rigidly fixed directly with the vehicle's frame adjacent the engine and cooling fan. Since the radiator is fixed with the frame and not with the vibrating engine, the radiator is generally isolated from the vibrations of the engine. When horizontal crank shaft engines are utilized in this manner, the radiator is positioned in a location proximate the vehicle frame and therefore the vehicle frame provides convenient structure to which the radiator can be rigidly fixed. When vertical crankshaft engines are utilized for lawn and garden tractor, the radiators are positioned above the engine and remote from the frame such that the vehicle frame does not provide structure to which the radiator can be mounted. Therefore, radiators are typically mounted directly to the engine when vertical crankshaft engines are used in lawn maintenance vehicles.

It would therefore be desirable to provide a mechanism for reducing the occurrence of damage in radiators that are positioned above vertical shaft engines in vehicles such as lawn and garden tractors. It would be desirable to provide a mechanism that allows less ruggedly constructed and therefore less costly radiators to be utilized with vertical crank shaft engines that vibrate substantially during operation, such that the overall cost to manufacture the vehicle is reduced. It would also be desirable for such a mechanism to be adapted for use with a vehicle that has an engine mounted with the frame by way of rubber type mounting bumpers or isolaters so that the vibrations created by the engine are not all transferred to the vehicle frame. This will insulate the seated operator from the vibrations of the engine and generally increase operator comfort.

SUMMARY OF THE INVENTION

According to the present invention, a structure is provided for mounting a radiator above a vertical crank shaft type diesel engine. A cooling fan positioned directly above the engine serves to pull cooling air downwardly through the radiator for removing heat from the radiator fluid. The radiator is held in position above the engine and cooling fan by being rigidly mounted to support members that are fixed with the vehicle frame. The radiator is not supported by or otherwise mounted with the engine. The engine is mounted to the frame by way of elastic or rubber mounting units that serve to generally absorb the vibrations of the engine during operation, and act to reduce the amount of engine vibrations transmitted to the frame during engine operation. The radiator is fixed with the frame via the support members and is not otherwise mounting with the engine, and therefore the radiator is generally isolated from engine vibrations by the elastic mounting units. Since the radiator encounters relatively little engine vibrations, the radiator is not subjected to damage or wear caused by excessive vibrations. Since the radiator encounters less vibration during vehicle operation, a less rugged radiator that is less costly to manufacture can be utilized according to the present invention and will perform satisfactorily and be sufficiently durable.

BRIEF DESCRIPTION OF THE DRAWINGS

FIG. 4 is right side assembled view of the vehicle components shown in FIGS. 2 and 3.

DESCRIPTION OF THE PREFERRED EMBODIMENT

Figure 1:
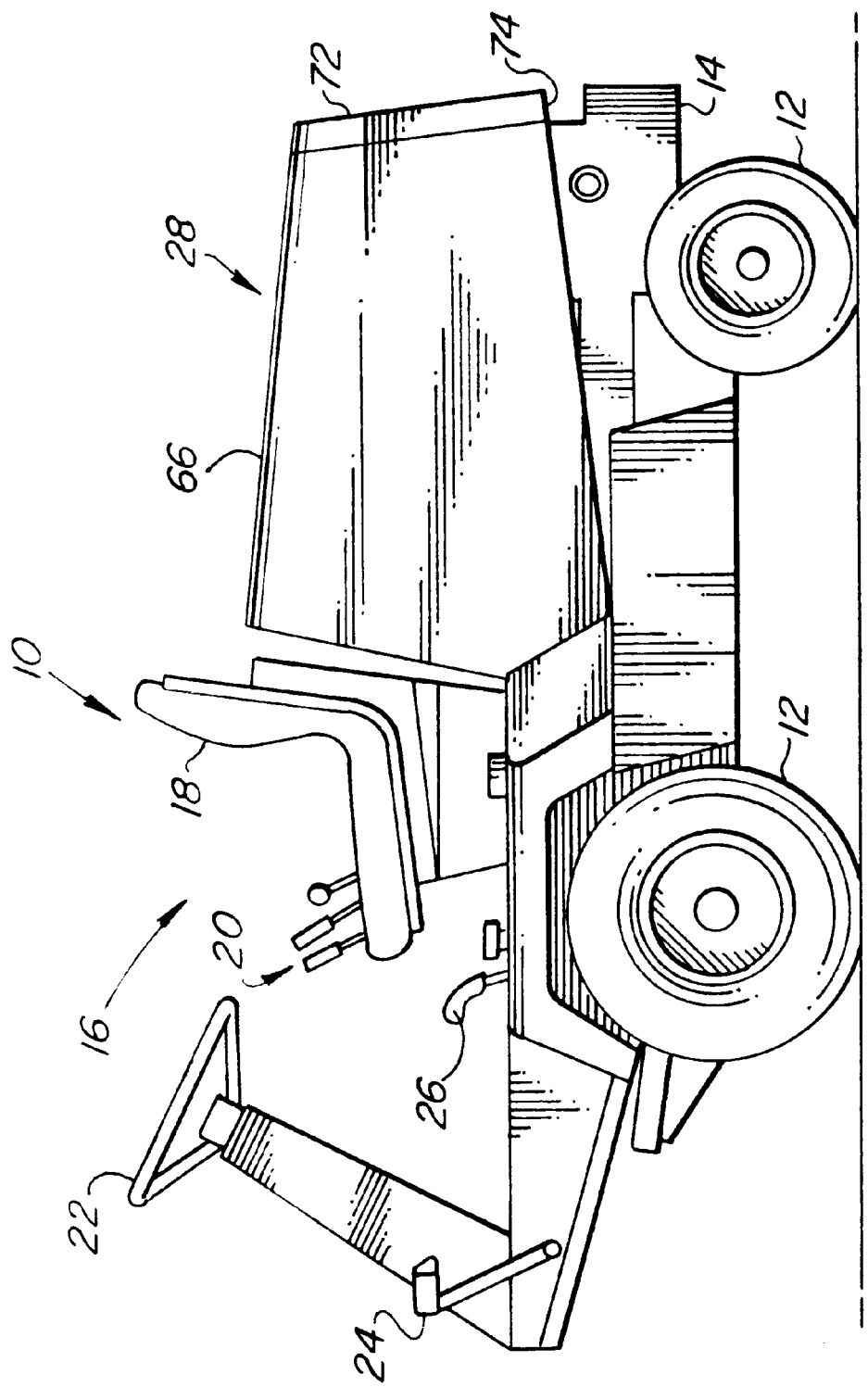
FIG. 1 is a left side view of a vehicle having a rear mounted engine and which is adapted for attaching an implement such as a mower deck or snow thrower to the front of the vehicle.

Referring now to FIGS. 1–4, there is shown the preferred embodiment of the present invention. As best seen in FIG. 1, a vehicle 10 is provided with ground engaging wheels 12 mounted with a vehicle frame 14. The vehicle 10 includes an operator station 16 which includes an operator seat 18. Vehicle controls 20 such as a steering wheel 22, foot pedals 24 and various control levers and switches 26 are positioned within reach of an operator seated in the operator station 16. A mower deck or other implement can be mounted to the front of the vehicle 10 for mowing grass or performing various other functions such as throwing snow.

Figure 2:
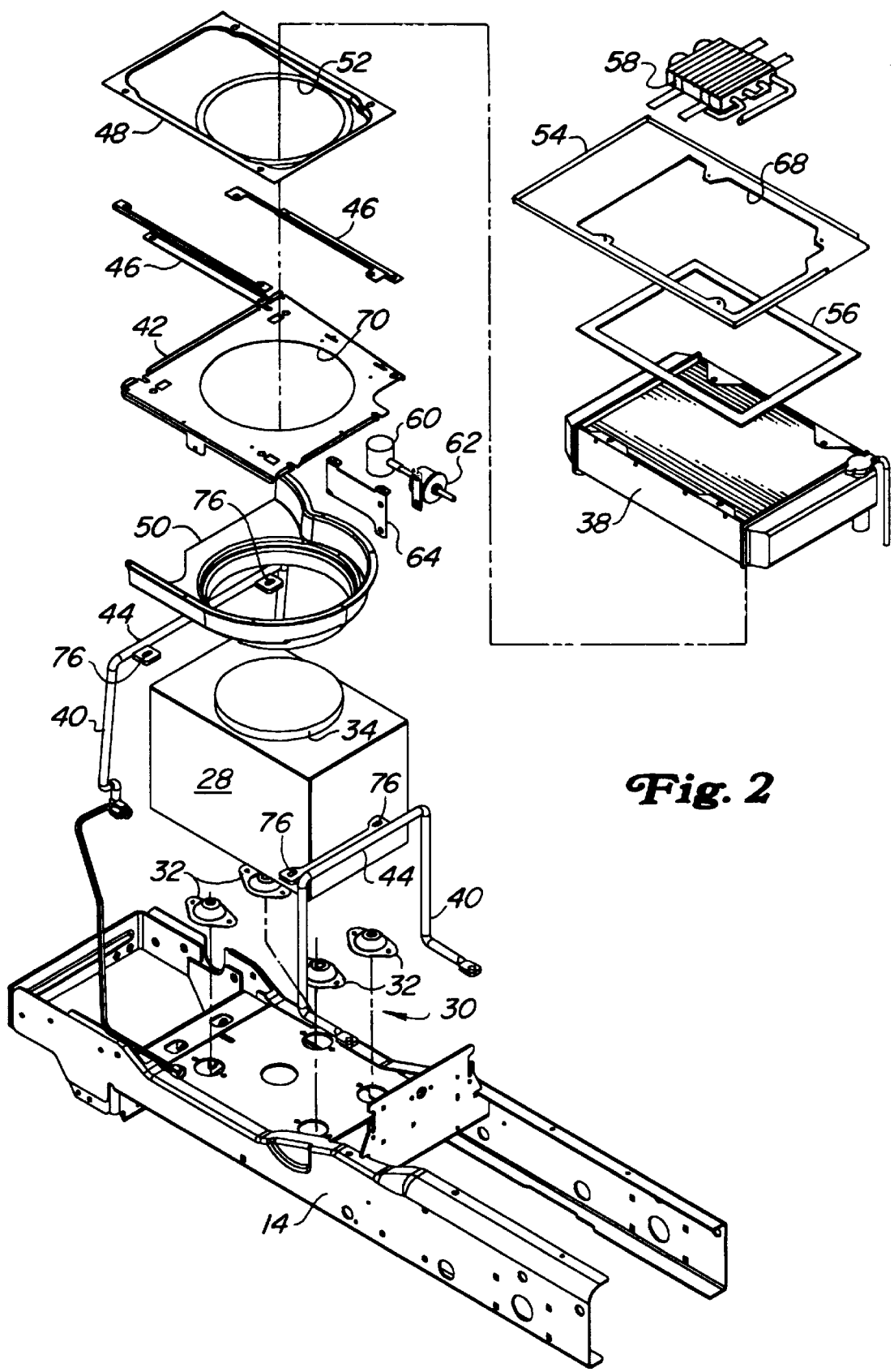
FIG. 2 is an exploded partial view from the right of the vehicle frame, engine, elastic mounting units, radiator and other parts supported by the support members.

As best seen in FIG. 2, the vehicle 10 is provided with a diesel engine 28 (shown schematically) that is fixed to the frame 14 by way of mounting units 30. The mounting units 30 include elastic or rubber members or isolators 32 that help absorb the vibrations of the engine 28 during operation without transmitting the vibrations into the vehicle frame 14. The engine 28 has a vertically oriented crank shaft. A cooling fan 34 which is shown schematically in FIG. 2, is operatively coupled with the crank shaft above the engine 28. The engine 28 is a water cooled type of engine and is fluidly coupled via a flexible radiator hose line 36 to a radiator 38 positioned above the engine 28.

The radiator 38 is not otherwise fixed directly to the engine 28, but rather is operatively supported by support members or rods 40 that extend upwardly from the frame 14. The support members 40 are bolted to the frame 14 to establish a rigid connection thereto. A plate 42 is fixed as by bolts to the upper portions 44 of the support members 40. A pair of brackets 46 are bolted to the top of the plate 42, and the radiator 38 is mounted directly to the brackets 46. A radiator shroud 48 is fixed directly beneath the radiator 38 for directing air that has passed downwardly through the radiator 38 to a location directly above the cooling fan 34. A fan shroud 50 is fixed as by rivets to the underside of the plate 42. The fan shroud 50 generally encloses the fan 34 positioned above the engine 28 and channels air flowing from the outlet 52 of the radiator shroud 48 downwardly toward the fan 34. A top plate 54 is bolted to the top portion of the radiator 38. A gasket 56 of an elastic material is positioned between the top plate 54 and the radiator 38. An oil cooler 58 is mounted to the top plate 54 directly above the radiator 38, and serves to cool the hydraulic fluid or oil within the vehicle's hydraulic system. The vehicle fuel pump 60 and filter 62 are coupled with a bracket 64 that is fixed with the plate 42.

Next the operation of the present invention will be described in greater detail. When the engine 28 is operating the fan 34 will serve to draw air into the vehicle hood 66. The air within the hood 66 will be directed such as by duct work to a position directly above the radiator 38. The air will then be drawn downwardly past the oil cooler 58, through the opening 68 in the top plate 54 and gasket 56, and on downwardly through the radiator 38. The fan 34 will continue to draw this air downwardly through the outlet 52 of the radiator shroud 48, through the opening 70 in the plate 42, and through the fan shroud 50 until it reaches the fan 34. The fan 34 then continues to blow the air rearwardly where it can exit the hood 66 through a grille formed in the rear wall 72 of the hood 66 or be directed downwardly across a muffler and exit the hood 66 near the rear bottom portion 74 of the hood 66.

The engine 28 is cooled by fluid that circulates between the engine 28 and the radiator 38. Heat from the engine 28 is transmitted to the fluid circulating within the engine 28. This fluid is then routed to the radiator 38 where the cooling air passing through the radiator 38 removes heat from the fluid. Once the fluid within the radiator 38 has been cooled by the passing air, the fluid is again directed back to the engine 28 where it will again remove heat from the engine 28.

The vertical crankshaft engine 28 is coupled with the frame 14 by way of elastic mounting members 32 that generally cushion or absorb the vibrations emanating from the engine 28 during operation. This serves to generally isolate the frame 14, other vehicle components and the operator from engine vibrations. Vehicle vibrations are thereby reduced which allows the other vehicle components to encounter less wear and tear caused by vibrations. Since the operator is generally isolated from the engine vibrations he will experience less vibrations and will therefore be more comfortable while operating the vehicle 10.

The radiator 38 is held in position above the cooling fan 34 and engine 28 solely by a pair of support members 40. The radiator 38 is rigidly fixed with the support members 40 and the support members 40 are rigidly fixed directly with the frame 14, not the engine 28. The radiator 38 is therefore effectively rigidly fixed with the frame 14. The radiator 38 is not directly supported by or coupled to the engine 28. Therefore, the radiator 38 does not vibrate with the engine 28. Rather, the radiator 38 is fixed with the frame 14 via the support members 40 and only receives vibrations via the frame 14. The frame 14, support members 40 and radiator 38 are isolated from the vibrations of the engine 28 by operation of the vibration absorbing elastic members or cushions 32 that couple the engine 28 to the frame 14. Since the radiator 38 is effectively isolated from the vibrations emanating from the engine 28, the radiator 38 will not vibrate excessively, and is therefore less likely to wear or be damaged by vibrations from the engine 28. Furthermore, since the radiator 38 experiences relatively little vibrational forces, the radiator 38 mounted according to the present invention is not required to be of rugged construction to withstand substantial vibrations. Less rugged, less costly radiators can therefore be utilized that will be of satisfactory durability and performance.

The radiator 38, radiator shroud 48, plate 42, brackets 46 and fan shroud 50 are suspended above the engine 28 by the support members 40. The fan 34 rotates about its axis within the fan shroud 50. A relatively small amount of clearance is provided between the outer edges of the fan blades and the interior diameter of the fan shroud 50. It is desirable to maintain a relatively small clearance so that the fan 34 operates efficiently. The fan 34 is supported by the engine 28, and the fan shroud 50 is supported by the radiator 38 and support members 40. Because of manufacturing tolerances the exact position of the fan 34 may be slightly different for different vehicles being assembled. Therefore, the fan shroud 50 may need to be shifted slightly when assembling different vehicles. The present invention provides slots 76 in the support members 40 that allow the radiator 38 and other parts operatively suspended from the support members 40 to be shifted slightly during the assembly process for allowing the fan shroud 50 to be precisely located with respect to the fan 34 such that the proper clearance is provided. Slots could also be provided in the frame for allowing the support members to be properly aligned and positioned during assembly.

Figure 3:
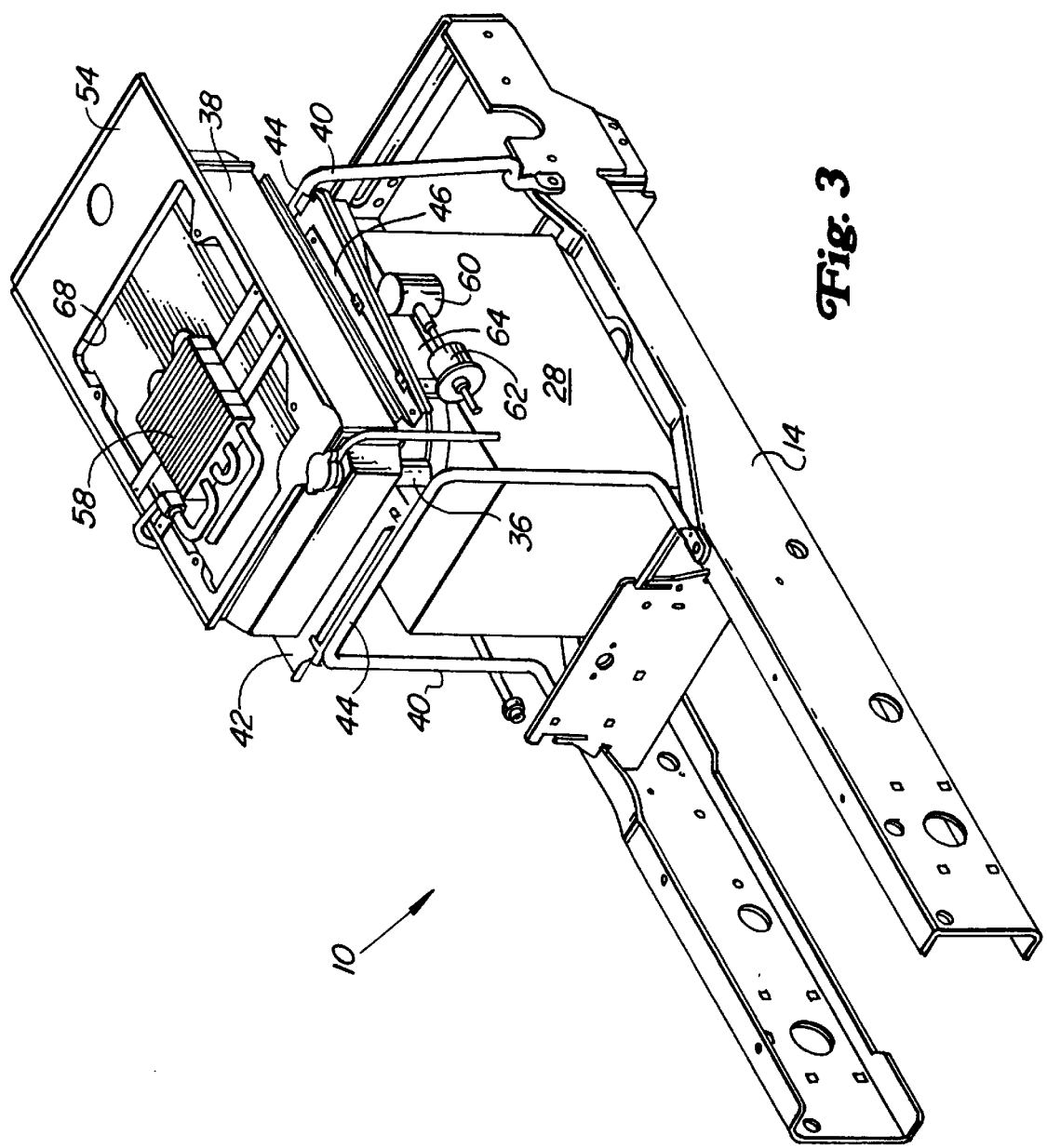
FIG. 3 is a perspective assembled view from the left of the vehicle components shown in FIG. 2.

FIGS. 2–4 show the fan shroud 50 being operatively coupled with and supported by the radiator 38 and support members 40. However, in an alternative embodiment, the fan shroud could also be fixed with the engine 28 and not supported by the radiator 38 or support members 40. Clearance would then be provided between the fan shroud and the parts suspended from the radiator 38 and support members 40. In such an alternative embodiment, a flexible boot could be provided between the fan shroud and the plate 42 for further confining the air being drawn in by the fan 34.

The present invention is shown in drawing FIGS. 1–4 as being utilized on a vehicle with a rear mounted engine and front mounted implements. The present invention is also adapted for use on a vehicle with an engine mounted in the front of the vehicle and with implements such as a mower deck mounted beneath or to the rear of the vehicle. Furthermore, the engine is described above as being diesel fueled, however the present invention could also be used with gasoline fueled engines.

I claim:

1. A vehicle, comprising:
   a frame to which a plurality of ground engaging wheels are coupled,
   an engine mounted to the frame via mounting units which allow the engine to vibrate with respect to the frame for reducing the amount of vibration that is transmitted from the engine to the frame during operation of the engine, said engine being operatively coupled to the ground engaging wheels for driving said ground engaging wheels,
   a radiator positioned directly above the engine, and having a weight,
   support members operatively coupled directly with and extending upwardly from the frame, the support members being operatively coupled with the radiator and support generally the entire weight of the radiator.

2. The invention of claim 1, wherein said engine is a vertical shaft engine.

3. The invention of claim 1, and further comprising a fan coupled with the engine and positioned above the engine and beneath the radiator.

4. The invention of claim 3, wherein a fan shroud is fixed with the radiator.

5. The invention of claim 3, wherein a plate member is fixed to the support members, and the radiator and a fan shroud are fixed with the plate member.

6. The invention of claim 1, wherein said support members are rigidly fixed with the frame, and the radiator is rigidly fixed with the support member.

7. The invention of claim 1, wherein the mounting units include elastic members which allow the engine to vibrate with respect to the frame during operation for hindering the vibrations of the engine from being transmitted to the frame.

8. The invention of claim 1, wherein the support members further comprise rod members fixed with and extending upwardly from the frame.

9. The invention of claim 1, wherein the radiator is rigidly fixed with the support members, and the support members are rigidly fixed with the frame, and the support members hold the radiator in fixed position with respect to the frame and spaced from the engine for isolating the radiator from vibrations emanating from the engine.

10. A vehicle, comprising:
    a frame supporting a plurality of ground engaging wheels,
    a vertical shaft engine mounted to the frame via mounting units which allow vibratory motion of the engine with respect to the frame for reducing the amount of vibration that is transmitted from the engine to the frame during operation of the engine, said engine being operatively coupled to the ground engaging wheels for driving said ground engaging wheels,
    a fan coupled with the engine directly above the engine, and
    a radiator positioned directly above the engine and fan, the radiator having a weight,
    support members operatively rigidly fixed with and extending upwardly from the frame, and the support members are rigidly fixed with the radiator and support generally the entire weight of the radiator.

11. The invention of claim 10, wherein the mounting units include elastic members which allow the engine to vibrate with respect to the frame during operation, said elastic members thereby hinder the vibrations of the engine from being transmitted to the frame.

12. The invention of claim 11, wherein said elastic members further comprise rubber members.

13. The invention of claim 12, and further comprising a fan shroud generally enclosing the fan and operatively rigidly fixed with the radiator.

14. The invention of claim 13, wherein a plate member is rigidly fixed to the support members, and the radiator and fan shroud are rigidly fixed with the plate member.

15. The invention of claim 14, wherein the support members further comprise rod members rigidly fixed with and extending upwardly from the frame.

16. The invention of claim 15, wherein the support members hold the radiator in fixed position with respect to the frame and spaced from the engine for isolating the radiator from vibrations emanating from the engine.

17. The invention of claim 10, and further comprising a fan shroud generally enclosing the fan and operatively rigidly fixed with the radiator.

18. The invention of claim 10, wherein a plate member is rigidly fixed to the support members, and the radiator and a fan shroud are rigidly fixed with the plate member.

19. The invention of claim 10, wherein the support members further comprise rod members rigidly fixed with and extending upwardly from the frame.

20. The invention of claim 10, wherein the support members hold the radiator in fixed position with respect to the frame and spaced from the engine for isolating the radiator from vibrations emanating from the engine.

21. A vehicle, comprising:
    a frame to which a plurality of ground engaging wheels are coupled,
    an engine mounted to the frame via mounting units which allow the engine to vibrate with respect to the frame for reducing the amount of vibration that is transmitted from the engine to the frame during operation of the engine, said engine being operatively coupled to the ground engaging wheels for driving said ground engaging wheels,
    support members operatively coupled with and extending upwardly from the frame,
    a radiator positioned directly above the engine, said radiator being supported in its position above the engine by being coupled with the support members without being otherwise supported by the engine, and
    wherein said support members are rigidly fixed with the frame, and the radiator is rigidly fixed with the support member.

22. A vehicle, comprising:
    a frame to which a plurality of ground engaging wheels are coupled,
    an engine mounted to the frame via mounting units which allow the engine to vibrate with respect to the frame for reducing the amount of vibration that is transmitted from the engine to the frame during operation of the engine, said engine being operatively coupled to the ground engaging wheels for driving said ground engaging wheels,
    support members operatively coupled with and extending upwardly from the frame,
    a radiator positioned directly above the engine, said radiator being supported in its position above the engine by being coupled with the support members without being otherwise supported by the engine, and
    wherein the support members further comprise rod members fixed with and extending upwardly from the frame.

23. A vehicle, comprising:

a frame to which a plurality of ground engaging wheels are coupled, an engine mounted to the frame via mounting units which allow the engine to vibrate wits respect to the frame for reducing the amount of vibration that is transmitted from the engine to the frame during operation of the engine, said engine being operatively coupled to the ground engaging wheels for driving said ground engaging wheels, support members operatively coupled with and extending upwardly from the frame, a radiator positioned directly above the engine, said radiator being supported in its position above the engine by being coupled with the support members without being otherwise supported by the engine, and wherein the radiator is rigidly fixed with the support members, and the support members are rigidly fixed with the frame, and the support members hold the radiator in fixed position with respect to the frame and spaced from the engine for isolating the radiator from vibrations emanating from the engine.

* * * * *